United States Patent [19]

Erzinger

[11] Patent Number: 4,693,755

[45] Date of Patent: Sep. 15, 1987

[54] METHOD AND COMPOSITION FOR REMOVING ASBESTOS-CONTAINING MATERIALS

[76] Inventor: Bradley F. Erzinger, 6003 S. Logan St., Littleton, Colo. 80121

[21] Appl. No.: 871,454

[22] Filed: Jun. 5, 1986

[51] Int. Cl.$^4$ .............................................. B08B 7/00
[52] U.S. Cl. .......................................... 134/4; 134/6; 106/169; 252/174.17; 252/174.18; 427/154
[58] Field of Search ................. 134/4, 6; 252/174.17, 252/174.18; 106/169; 427/154, 156

[56] References Cited

U.S. PATENT DOCUMENTS

| | | | |
|---|---|---|---|
| 4,274,884 | 6/1981 | Cartwright | 134/4 |
| 4,347,150 | 8/1982 | Arpin | 252/135 |
| 4,529,449 | 7/1985 | Baustert | 134/4 |
| 4,586,962 | 5/1986 | Barabas | 134/4 |
| 4,632,847 | 12/1986 | Lomasney et al. | 427/154 |
| 4,632,848 | 12/1986 | Gosset et al. | 427/154 |

FOREIGN PATENT DOCUMENTS

| | | | |
|---|---|---|---|
| 61-50474 | 4/1980 | Japan | 134/4 |
| 644791 | 10/1950 | United Kingdom | 2/95 C |
| 1525465 | 12/1974 | United Kingdom | 134/4 |

*Primary Examiner*—Asok Pal
*Attorney, Agent, or Firm*—Dorr, Carson, Sloan & Peterson

[57] ABSTRACT

Asbestos-containing materials can be removed from their substrate by (1) applying a composition containing a cellulosic polymer such as hydroxypropyl cellulose to said asbestos-containing material; (2) allowing the cellulosic polymer containing composition time to penetrate and wet the asbestos-containing material; and (3) removing the resulting wet asbestos-containing material by use of mechanical forces.

3 Claims, No Drawings

METHOD AND COMPOSITION FOR REMOVING ASBESTOS-CONTAINING MATERIALS

BACKGROUND OF THE INVENTION (1) Field of the Invention

This invention relates to compositions and methods for removing asbestos-containing materials from their associated substrates.

(2) Description of the Prior Art

Until recent times, exposure to asbestos was recognized as a problem only from the standpoint of occupational health hazards to asbestos workers. Now, however, it is generally accepted that serious exposure problems also can occur in buildings constructed with fireproofing, insulation and decorative materials made at least in part from asbestos. Asbestos-containing coating and plastering materials are regarded as being particularly hazardous since they tend to become friable, and hence easily entrained into the air, as they deteriorate with age.

Concern about environmental contamination by asbestos-containing materials has manifested itself in many ways including the promulgation of numerous Federal Regulations dealing with the subject. For example, one widely quoted OSHA asbestos exposure standard calls for concentrations of less than 2 fibers/cc $\times$ 8 hours with no peaks greater than 10 fibers/cc $\times$ 15 minutes. Such concerns are well taken. Asbestosis, a disease of the lungs produced by inhalation of asbestos fibers, has come to be recognized as being associated with an extreme liability to lung cancer as well as being an often fatal malady in its own right. Moreover, detection of such asbestos-related diseases is impeded by the fact that the latency period between exposure and appearance of such disease is sometimes as much as 25 years.

Unfortunately, asbestos has been widely used in the past owing to its excellent fire inhibiting qualities. For example, it was the practice for many years to spray or brush asbestos-containing coating materials onto structural steel to retard structural collapse in case of fire. Many plaster formulations also were provided with asbestos as a fireproofing measure. Asbestos-containing materials have also been coated on ceilings and walls for thermal and acoustic insulation purposes. Many of these insulation materials used in the past were comprised of mixtures of asbestos and mineral rock, slag-wool or fiber glass. Other formulations incorporated asbestos into wood pulp, paper fibers and non-fibrous binders such as vermiculite, plaster of Paris, perlite and clay. Asbestos has also been widely used in decorative and textured spray finishes and paints. The asbestos content of these materials was usually in the range of about 5 to about 50 percent by weight. They usually were applied in layers less than about one inch thick and very often are found in coating layers less than about one quarter inch thick.

Over the years many of these asbestos-containing materials have become friable—that is they have deteriorated to such an extent that they have become flaky or dust-like and hence capable of easily being entrained in a building's atmosphere. Furthermore, even though the finish of many asbestos-containing coatings and plasters may seem hard, it is often the case that asbestos fibers, which are invisible to the naked eye, come through the finish and are released from such apparently hard coating materials, particularly as they age. Asbestos-containing materials have other bad attributes as well. Asbestos fibers are very persistent as well as very pernicious. They are not easily degraded or destroyed and they tend to persist in the environment almost indefinitely. Finally, the size and shape of asbestos fibers are such that they possess certain aerodynamic qualities. They can travel great distances and remain suspended in air for very long periods of time. Moreover, asbestos fibers that do settle to the floor are easily stirred up by pedestrian traffic and the like and reintroduced back into a building's environment.

Given the proportion of our residential, industrial and commercial building stock that has been made with asbestos-containing materials, and given the relatively recent recognition of the severity of the health hazards associated with the release of asbestos fibers into their atmospheres, many methods have been proposed to deal with asbestos pollution problems in buildings now in use. Such methods generally fall into two broad categories, encapsulation and removal. In the case of encapsulation, the asbestos-containing material should be coated with sealants meeting Environmental Protection Agency (EPA) codes and regulations. See generally: *Guideline For The Use of Sealants on Asbestos-Containing Materials*, Prepared by Mr. Forest Reinhardt, Office of Toxic Substances, United States Environmental Protection Agency, 1980. If done properly, encapsulation permits the asbestos-containing material to remain safely in place for longer periods of time than it otherwise could. However, at best, encapsulation represents a temporary measure since sealants also will deteriorate with time.

Unfortunately, encapsulation methods are largely ineffective where the asbestos-containing material has undergone significant physical damage due to impacts and/or aging. This condition is prevalent in many older buildings. In such cases physical removal is the only safe alternative. Removal procedures require that all asbestos-containing materials be taken off their underlying substrates, carefully collected and disposed of, preferably by burial.

To date no adequate chemical removal procedures have been developed. Consequently, removal, by use of hand held impact and cutting tools, is the only viable removal method for asbestos coating and plastering materials. Vacuum tools have been tried, but the adhesive bond between most asbestos-containing materials and the underlying surfaces upon which they are coated or plastered are usually much stronger than the vacuum capabilities of ordinary vacuum equipment. Moreover, many areas are inaccessible to all but the smallest of tools. Hence scraping, chiseling and scoring, usually by simple hand tools, remains the most common method of mechanical removal.

Even more vexing is the fact that many asbestos-containing materials tend to pulverize upon impact or scraping rather than shear off in large pieces at the interface between the asbestos coating material and the substrate. Not only do these conditions greatly increase hand labor requirements, but they also result in heavy asbestos dust contamination. Work crews and neighboring personnel must be carefully protected against it. This usually involves great inconvenience and expense.

One method of dealing with such dust contamination problems during removal operations involves a simple wetting operation. Water is sprayed on the coating or plaster which is about to be removed in order to lower the friability of the asbestos-containing material and to reduce the aerodynamic capabilities of any released asbestos fibers. Unfortunately, water spraying is not a particularly satisfactory solution to the problem. Simple water spraying, at best, provides a slow, incomplete penetration of the asbestos-containing materials, and it often produces water damage to the building as it runs off of the surfaces being sprayed. Such water run-off not only creates water damage and clean-up problems, it also creates another distinct safety problem. Asbestos fibers may be carried to other areas by the water. Once there, the asbestos fibers can dry out and become reintroduced into another, distant environment.

In response to these problems, aqueous solutions containing various surfactants have been used to aid wet removal procedures of this type, In the presence of such surfactants, water penetration into the asbestos-containing fiber is somewhat improved. Hence less water runs off and less asbestos-containing dust is created. Common surfactants used for these purposes have included polyethylene oxide condensates of alkyl phenols; the condensation products of aliphatic alcohols and ethylene oxide; the condensation products of ethylene oxide with a hydrophobic base formed by the condensation of propylene oxide with propylene glycol; condensation products of amines, amides or mercaptans with ethylene oxide or propylene oxide; products formed by reacting ethanolamines with fatty acids; amine oxide surfactants; phosphine oxide surfactants and sulfoxide surfactants. Notwithstanding these advantages such surfactant treatments suffer from at least one of the drawbacks encountered with treatments based upon the use of water alone, i.e., following run-off and evaporation, asbestos fibers can become reentrained in the air at distant locations.

Consequently, various other asbestos stripping compositions have been proposed to deal with these asbestos dust, water damage and run-off problems. By way of example, U.S. Pat. No. 4,347,150 teaches an asbestos stripping composition which provides for a wet removal method which produces much less water run-off and significantly lowers the dust created during the wet removal operations. Such asbestos removal compositions often are supplied as two component formulations which are prepared just prior to use. The first component usually comprises an aqueous silicate dispersion of selected alkali metal silicates blended with a cationic or nonionic surfactant. The second component usually comprises some form of an acrylic latex composition containing a reagent that is reactive with the alkali metal silicate of the first component formulation. Common reagents used for this purpose include hydroxycarboxylic acids and salts of organic acids, e.g., gallic acid, citric acid and tartaric acid.

The aqueous silicate component is prepared by blending potassium silicate or a mixture of potassium silicate and sodium silicate with a cationic surfactant such as amine salts, fatty esters of primary, secondary or tertiary hydroxyalkyl amines or with nonionic surfactants such as polyethylene oxide condensates of alkyl phenols, the condensation products of aliphatic alcohols and ethylene oxide. The acrylic polymer of the second composition is usually selected from the group consisting of homopolymers and copolymers of lower alkyl esters of acrylic acid or lower alkyl esters of an alpha-lower alkyl acid or mixtures thereof. Again, the two components are usually stored separately for increased storage life and mixed shortly before application.

However, because of the relative complexity and expensive nature of some of their component ingredients, formulations of this type are relatively expensive. They also require a great deal of time and agitation energy to effect the reaction of the alkali metal silicates of the first component with the hydroxycarboxylic acid, salts of organic acids, etc., of the second component. Of even more import to the teachings of this patent application, the end products of the above-noted silicate/acrylic latex formulations are intended to be used in a wet condition throughout the ensuing removal operations. The wet condition produced by these formulations does not last for more than a few hours. Hence the work surface may have to be resprayed in order to keep down asbestos dust. Moreover, the ability of these formulations to penetrate to the deepest regions of the asbestos-containing material is somewhat curtailed by the tendency of these formulations to dry before complete penetration of many asbestos-containing materials. Hence the asbestos-containing materials they partially penetrate are not ptarticularly inclined to break away from their substrates at the substrate/asbestos material interface and/or break in relatively large pieces. At best, the application of these silicate/acrylic latex formulations tends to produce asbestos-containing materials which normally break away in localized, small wet clumps rather than at the substrate interface. Furthermore, to the extent these formulations fail to completely penetrate the asbestos-containing material, dust will be created from the remaining dry material. These characteristics tend to greatly add to the safety considerations and the labor costs of any given asbestos removal operation.

SUMMARY OF THE INVENTION

ACTIVE INGREDIENTS

According to the present invention there is provided compositions and methods for removing asbestos-containing materials such as, for example, asbestos coatings and/or plastering materials from the structural and decorative building members upon which such asbestos-containing materials have been placed. The most simple formulations of this patent disclosure are comprised of a cellulosic polymer in an appropriate liquid carrier. Compositions having multiple cellulosic polymer ingredients and/or multiple carriers are also included in the teachings of this patent disclosure. Optionally, these compositions may also contain auxiliary ingredients such as dyes or other coloring agents, thickening agents, inert filling agents, preservatives, wetting agents, humectants, surfactants, solvents, pH adjusting agents and the like.

Suitable cellulosic polymers for the practice of this invention would include, for example, hydroxyethyl cellulose, hydroxypropyl cellulose, methylcellulose, carboxymethylcellulose, ethylcellulose, diethylaminoethyl cellulose, epichlorohydrintriethanolamine cellulose, trimethyl cellulose and the like. Cellulosic polymers are produced in microcrystalline forms and heretofore were used as thickening agents, substitutes for water-soluble gums, adhesives, protective colloids in emulsions, bulk laxatives, foam stabilizers, explosives and lacquers. Such cellulosic polymers are sold under a variety of trade names by various manufacturers, e.g., METHOCEL (Dow Chemical), NATROSOL (Hercules Chemicals Limited), KLUCEL H (Hercules Chemicals Limited), AVICEL (FMC Corporation) and CMC (Hercules, Chemical Limited). Methylcellulose, for example, has been marketed under such trade names as METHOCEL; CELLOTHYL; SYNCELOSE; BAGOLAX; CETHYLOSE; CETHYTIN; COLOGEL; CELLUMETH; HYDROLOSE; and TYLOSE.

In general, cellulosic polymers are prepared from wood pulp or chemical cotton starting materials by treatment with alkali followed by methylation of the alkali cellulose with methyl chloride. The degree of substitution of the cellulosic material can vary considerably. By way of example, commercially produced methylcellulose usually has a methoxyl content of about 29% and hence a degree of substitution of about 1.8. Such cellulosic polymers are also often prepared in food or pharmaceutical grades as well as in industrial grades; e.g., KLUCEL-HF and CMC-7HF are examples of food grade cellulosic polymers. Obviously, for reasons of expense, the industrial grade cellulosic polymers are highly preferred for the practice of this invention.

METHODS OF PREPARATION

The compositions used to carry out the methods of this invention, in their most simple forms consist of a cellulosic polymer and a carrier for that cellulosic polymer. They adhere to asbestos-containing materials as wet gels and promote a deep penetration of such materials. As indicated above, the cellulosic polymer will be from about 1 to about 30 percent by weight of the composition; more preferably, however, the composition will be from about 5 to about 20 percent by weight of the composition. Compositions having from 8–12 percent by weight cellulosic polymers are most preferred.

Most preferably, the cellulosic polymer will be water soluble, or made to be water soluble by various known techniques such as those hereinafter described. By way of example, many such cellulosic polymers can be made water soluble or miscible by adjusting the pH of the water carrier by use of strong bases such as potassium hydroxide or ammonia. There are however known exceptions even to this technique. The ether forms of certain cellulosic polymers, e.g., methylcellulose, ethylcellulose and benzylcellulose are known to be stable to water and alkali. However, it is also well known that the solubility and dispersability of such cellulosic polymers in water or other usual solvents can be aided by known techniques such as by use of concentrated solutions of zinc chloride, ammoniacal copper hydroxide (Schweitzer's solution), caustic alkali with carbon disulfide. By way of further example it is well known that methylcellulose is soluble in cold water, but insoluble in hot water. Therefore compositions of this invention employing methylcellulose as the cellulosic polymer ingredient are best prepared by dispersing the methylcellulose in hot (but not boiling) water with stirring followed by chilling. The resulting solution is then stable at normal room temperatures. The presence of inorganic salts can be employed to increase solution viscosities using the above technique. Solvents other than water are, for reasons of expense and safety, less preferred. For best results, the composition will be applied as a spray which takes on gel-like qualities. Such gels will maintain a tacky quality for long periods and allow for complete penetration of most asbestos-containing materials.

METHOD OF USE

Preferably the compositions of this invention are prepared just prior to their use. Normally, the cellulosic polymer material will be added to the water carrier in a container and mixed by agitation. Powered impeller agitation is preferred but not mandatory. Optional ingredients may be a constituent part of the cellulose polymer component or of the carrier. When, for example, the cellulosic polymer source is the cellulose polymer composition HEC, ingredients such as propylene glycol, polyvinyl acetate, chlorinated and wetting agents are included as part of the product. One or more of the optional ingredients may also be added separately when the cellulosic polymer and carrier are mixed. For example, select dyes or coloring agents such as zinc oxide can be added to contrast with the particular color of the asbestos-containing material about to be removed, This will enable workmen to mark where they have applied the composition and where they have not. Overall mixing times will depend largely on the concentration of the cellulosic polymer in the composition. However, mixing times of from about 1 to about 15 minutes will suffice in most instances. The composition will take on a gel-like quality which serves to aid the penetration function of the composition. Most preferably, the removal operations are carried out while the resulting substance is in a wet state. Normally this wet state will exist for 24 hours or more. However, best results are usually obtained when removal operations are carried out from about 1 to about 8 hours after application of the cellulosic polymer composition.

Therefore, according to another aspect of the present invention there is provided a method for removing from a supporting substrate surface, asbestos-containing materials such as asbestos-containing coatings and plasters. This method includes the steps of: applying to the asbestos-containing material, a composition comprised of a cellulosic polymer and a liquid carrier; allowing the composition sufficient time to penetrate the asbestos-containing material; subjecting the resulting, wet asbestos-containing/cellulosic polymer substance to mechanical forces to separate the wet, asbestos-containing-/cellulosic polymer substance from its substrate surface, and; collecting the asbestos-containing debris for disposal.

In such use, the asbestos removing compositions of this patent disclosure are applied to an asbestos-containing material such as a coating or plaster by use of some convenient applicator. Application can be by brush, roller or most preferably by low pressure spray equipment such as that normally used to spray "textured" ceilings. After a period of time depending on the nature and thickness of the asbestos-containing material, but normally between about 1 and about 24 hours, the composition will penetrate and wet the asbestos-containing material. The composition will adhere to the asbestos-containing material in the form of a wet gel. For most asbestos-containing materials, such penetration and wetting will be completed in about 2 to about 8 hours. Again, however, our composition will remain in a wet gel state for periods up to and even beyond 24 hours. Given a sufficient quantity of the composition and sufficient time the composition will penetrate up to about two inches into many asbestos-containing materials. The continued wet state of the resulting substance will serve to keep down dust during removal operations. In general one gallon of brush coated composition having about 10% cellulose polymer ingredient proportion will cover from about 25 to about 50 square feet of surface area of most typical asbestos-containing materials.

In any case, the resulting substance becomes a wet yet coherent, asbestos-containing/cellulosic polymer-like layer of material. Penetration often goes down to the depth of many of the substrates encountered in many removal operations. Asbestos-containing materials having thicknesses greater than about two inches may however require multiple removal steps. In any case, the resulting substances produced by the application of the compositions of this patent disclosure tend to form layers which are wet yet still cohesive enough that they tend to break in large pieces or strips at the asbestos material/substrate interface, as opposed to becoming a dust or a powder in nonwetted regions or becoming a damp paste in localized areas as they do with prior art dry and prior art wet removal procedures. The resulting substances of these cellulosic polymer applications also have a quality of wet penetration but cohesion which makes for fractures and breaks in the tested substances at convenient intervals. Pieces having about one square foot of surface area very often result. This is to be compared with wet removal techniques using the previously discussed prior art compositions where similar mechanical forces would result in removal of much smaller areas of the asbestos-containing material. Moreover, the wet removal of the resulting substance produced by the composition and methods of this patent disclosure result in much less asbestos dust than most prior art wet removal methods.

OPTIONAL INGREDIENTS

Many optional ingredients may be added to the asbestos removal compositions taught in this disclosure. The most common optional ingredients will include, for example, dyes and coloring agents, inert fillers, suspending and thickening agents, humectants, emulsifying agents, pH adjustment agents, solvents and the like. When commercial sources of cellulosic polymers are employed, they usually come with one or more of the above types of ingredients which are optional in the practice of this invention.

A particularly useful coloring agent for these compositions is zinc oxide. It mixes easily with these compositions and produces a color which contrasts with most other colors commonly encountered on asbestos removal jobs.

Inert fillers useful for the practice of the present invention would include, for example, finely ground clay, chalk, talc and the like.

Suspending and thickening agents may be used to promote the spreading capacity of the cellulose polymer composition, particularly in those cases where the composition contains little or no inert filling material. It may also aid the retention of an inert filler or powdered emulsifying agent in suspension in embodiments containing such particles. Suitable suspending and/or thickening agents would include emulsifying waxes such as chlorinated paraffins, high molecular weight polyethylene glycols, and surface treated clays such as, in the case of a composition using a water carrier, a magnesium montmorillonite. Use of thickening and suspending agents may also help to prevent evaporation of the cellulose polymer immediately after application. This slow down of the evaporation process may give the cellulose polymer a greater opportunity to soak deeply into the asbestos-containing material, preferably down to the level of the substrate material. Humectants such as glycerine, propylene glycol or polyethylene may also be used for this purpose.

Preferably, any emulsifying agents used in the formulations of this invention also will be detergents or wetting agents which may assist the penetration of the cellulosic polymer into the asbestos-containing material.

In compositions containing ingredients which are not soluble or immiscible in water, various ingredients capable of adjusting the pH of the composition may be employed. Caustic and/or ammonia for example might be used to make the composition more basic.

This invention can be further understood by referring to the following illustrative examples in which percentages of the entire composition are by weight unless otherwise indicated. The following are representative of various composition formulations for general as well as specific use. Those skilled in the art will appreciate that the following compositions as well as the methods by which they are used for removing asbestos-containing materials are offered by way of example only. They should not be considered as limiting this invention to any of the particular compositions or conditions of use hereinafter illustrated.

| Ingredients | FORMULATIONS Weight % | Function |
|---|---|---|
| EXAMPLE 1 | | |
| hydroxypropyl-cellulose | 1 | active ingredient |
| water | 99 | carrier |
| EXAMPLE 2 | | |
| hydroxypropyl-cellulose | 10 | active ingredient |
| water | 90 | carrier |
| EXAMPLE 3 | | |
| hydroxypropyl-cellulose | 30 | active ingredient |
| water | 70 | carrier |
| EXAMPLE 4 | | |
| hydroxyethyl cellulose | 1 | active ingredient |
| water | 99 | carrier |
| EXAMPLE 5 | | |
| hydroxyethyl cellulose | 5 | active ingredient |
| water | 70 | carrier |
| propylene glycol | 20 | emulsifying agent |
| chlorinated paraffin | 5 | thickening agent |
| EXAMPLE 6 | | |
| hydroxyethyl cellulose | 20 | active ingredient |
| water | 80 | carrier |
| EXAMPLE 7 | | |
| methylcellulose | 2 | active ingredient |
| water | 98 | carrier |
| EXAMPLE 8 | | |
| methylcellulose | 10 | active ingredient |
| water | 90 | carrier |
| EXAMPLE 9 | | |
| methylcellulose | 20 | active ingredient |
| water | 65 | carrier |
| propylene glycol | 8 | emulsifying agent |
| chlorinated paraffin | 2 | thickening agent |
| ethanol | 3 | wetting agent |
| zinc oxide | 2 | coloring agent |
| EXAMPLE 10 | | |
| carboxymethyl-cellulose | 5 | active ingredient |

| Ingredients | Weight % | Function |
|---|---|---|
| water | 95 | carrier |
| EXAMPLE 11 | | |
| carboxymethyl-cellulose | 10 | active ingredient |
| water | 90 | carrier |
| EXAMPLE 12 | | |
| METHOCEL | 10 | active ingredient |
| water | 70 | carrier |
| propylene glycol | 20 | emulsifying agent |
| EXAMPLE 13 | | |
| NATROSOL | 10 | active ingredient |
| water | 70 | carrier |
| propylene gylcol | 20 | emulsifying agent |
| EXAMPLE 14 | | |
| NATROSOL | 20 | active ingredient |
| water | 40 | carrier |
| propylene glycol | 30 | emulsifying agent |
| polyvinyl acetate | 10 | thickening agent |
| EXAMPLE 15 | | |
| KLUCEL-H | 7 | active ingredient |
| water | 90 | carrier |
| zinc oxide | 3 | coloring agent |
| EXAMPLE 16 | | |
| KLUCEL-H | 15 | active ingredient |
| water | 75 | carrier |
| chlorinated paraffin | 10 | emulsifying agent |
| EXAMPLE 17 | | |
| KLUCEL-HF | 15 | active ingredient |
| water | 85 | carrier |
| EXAMPLE 18 | | |
| CMC | 10 | active ingredient |
| water | 90 | carrier |
| EXAMPLE 19 | | |
| CMC | 17 | active ingredient |
| water | 70 | carrier |
| polyvinyl acetate | 5 | thickening agent |
| chlorinated paraffin | 5 | emulsifying agent |
| zinc oxide | 3 | coloring agent |
| EXAMPLE 20 | | |
| METHOCEL | 5 | active ingredient |
| water | 75 | carrier |
| EXAMPLE 21 | | |
| METHOCEL | 10 | active ingredient |
| water | 90 | carrier |
| EXAMPLE 22 | | |
| HEC | 5 | active ingredient |
| water | 65 | carrier |
| polyvinyl acetate | 10 | thickening agent |
| propylene glycol | 20 | humectant |
| EXAMPLE 23 | | |
| hydroxyethyl cellulose | 10 | active ingredient |
| water | 50 | carrier |
| polyvinyl acetate | 10 | thickening agent |
| propylene glycol | 30 | humectant |
| EXAMPLE 24 | | |
| NATROSOL | 8 | active ingredient |
| water | 62 | carrier |
| polyvinyl acetate | 10 | thickening agent |
| propylene glycol | 20 | humectant |
| EXAMPLE 25 | | |
| METHOCEL | 10 | active ingredient |
| water | 55 | carrier |
| polyvinyl acetate | 10 | thickening agent |
| propylene glycol | 25 | humectant |
| EXAMPLE 26 | | |
| hydroxyethyl cellulose | 5 | active ingredient |
| water | 60 | carrier |
| polyvinyl acetate | 10 | thickening agent |
| propylene glycol | 25 | humectant |
| EXAMPLE 27 | | |
| hydroxyethyl cellulose | 1 | active ingredient |
| water | 90 | carrier |
| polyvinyl acetate | 5 | thickening agent |
| propylene glycol | 5 | humectant |
| EXAMPLE 28 | | |
| hydroxyethyl cellulose | 5 | active ingredient |
| water | 40 | carrier |
| polyvinyl acetate | 10 | thickening agent |
| chlorinated paraffin | 10 | emulsifying agent |
| propylene glycol | 30 | humectant |
| ethanol | 2 | wetting agent |
| zinc oxide | 3 | coloring agent |
| EXAMPLE 29 | | |
| methylcellulose cellulose | 6 | active ingredient |
| water | 50 | carrier |
| polyvinyl acetate | 10 | thickening agent |
| chlorinated paraffin | 10 | emulsifying agent |
| propylene glycol | 20 | humectant |
| propanol | 1 | wetting agent |
| zinc oxide | 3 | coloring agent |
| EXAMPLE 30 | | |
| carboxymethyl cellulose | 10 | active ingredient |
| water | 50 | carrier |
| chlorinated paraffin | 10 | thickening agent |
| polyvinyl acetate | 5 | emulsifying agent |
| propylene glycol | 20 | humectant |
| propanol | 2 | wetting agent |
| zinc oxide | 3 | coloring agent |

REMOVAL OF ASBESTOS-CONTAINING MATERIALS

EXAMPLE 31

A trial substrate comprised of an asbestos-containing material (a plaster) which was approximately 2 inches thick, and which covered a concrete substrate, was brush coated with various compositions described in this patent disclosure. They were allowed to penetrate and dry for 8 hours. About 3 gallons were used to cover about 100 square feet of the surface area under consideration. Other areas were merely wetted with water. It was estimated that the labor for removing the asbestos-containing material was 70 to 90 percent less than that required for the uncoated area. Compositions similar to those disclosed in Examples 28, 29 and 30 gave particularly good results not only in terms of reduced labor requirements, but also in terms of reduced airborne asbestos concentrations.

I claim:

1. A process for removing an asbestos-containing material from a substrate surface comprising the sequential steps of:
   applying to the asbestos-containing material, a composition comprised of from about 1 to about 30 percent by weight of a cellulosic polymer and from about 99 to about 70 percent by weight of a liquid carrier;
   allowing the resulting gel-like composition sufficient time to penetrate the asbestos-containing material and form a wet asbestos-containing/cellulosic polymer substance;
   subjecting the wet asbestos-containing/cellulosic polymer substance to mechanical forces selected from the group consisting of scraping, chiseling, impacting, scoring, shearing and vacuuming to separate the wet asbestos-containing/cellulosic polymer substance from its substrate surface and;
   collecting the resulting asbestos-containing debris for disposal.

2. A process for removing an asbestos-containing material from a substrate surface comprising the sequential steps of:
   applying to the asbestos-containing material, a composition comprised of from about 5 to about 20 percent by weight of a cellulosic polymer selected from the group consisting of hydroxypropyl cellulose, hydroxyethyl cellulose, methylcellulose, and carboxymethyl cellulose and from about 95 to about 80 percent by weight of water;
   allowing the resulting gel-like composition sufficient time to penetrate the asbestos-containing material and form a wet asbestos-containing/cellulosic polymer substance;
   subjecting the wet asbestos-containing/cellulosic polymer substance to mechanical forces selected from the group consisting of scraping, chiseling, impacting, scoring, cutting, shearing and vacuuming to separate the wet asbestos-containing/cellulosic polymer substance from its substrate surface; and
   collecting the resulting asbestos debris for disposal.

3. A process for removing an asbestos-containing material from a substrate surface comprising the sequential steps of:
   mixing a cellulosic polymer selected from the group consisting of hydroxypropyl cellulose, hydroxyethyl cellulose, methylcellulose and carboxymethyl cellulose, with water to from an asbestos stripping composition comprised of from about 5 to about 20 percent by weight of the cellulosic polymer and from about 95 to about 80 percent water;
   spraying the asbestos stripping composition to the asbestos-containing material and allowing composition to form a gel-like composition;
   allowing the gel-like asbestos stripping composition at least two hours to penetrate the asbestos-containing material and form a wet asbestos-containing/cellulosic polymer substance;
   subjecting the wet asbestos-containing/cellulosic polymer substance to mechanical forces selected from the group consisting of scraping, chiseling, impacting, scoring, cutting, shearing and vacuuming to separate the wet asbestos-containing/cellulosic polymer substance from its substrate surface; and
   collecting the resulting asbestos-containing debris for disposal.

* * * * *